(12) United States Patent
Paxton et al.

(10) Patent No.: US 8,498,485 B2
(45) Date of Patent: Jul. 30, 2013

(54) HANDPRINT RECOGNITION TEST DECK

(75) Inventors: K. Bradley Paxton, Webster, NY (US);
William L. DiBacco, Rochester, NY (US); Steven P. Spiwak, West Henrietta, NY (US); Craig A. Towne, Canandaigua, NY (US); Manuel Trevisan, Rochester, NY (US)

(73) Assignee: ADI, LLC, Rochester, NY (US)

( * ) Notice: Subject to any disclaimer, the term of this patent is extended or adjusted under 35 U.S.C. 154(b) by 0 days.

(21) Appl. No.: 13/446,835

(22) Filed: Apr. 13, 2012

(65) Prior Publication Data

US 2012/0218575 A1 Aug. 30, 2012

Related U.S. Application Data

(63) Continuation of application No. 10/933,002, filed on Sep. 2, 2004, now abandoned.

(51) Int. Cl.
| | |
|---|---|
| G06K 9/00 | (2006.01) |
| G06K 9/34 | (2006.01) |
| G06K 9/62 | (2006.01) |
| G06F 3/12 | (2006.01) |
| H04N 1/60 | (2006.01) |

(52) U.S. Cl.
USPC ........... 382/187; 382/177; 382/179; 382/155; 358/1.9; 358/1.13

(58) Field of Classification Search
USPC .................................. 382/115; 358/1.9, 1.13
See application file for complete search history.

(56) References Cited

U.S. PATENT DOCUMENTS

| | | | | |
|---|---|---|---|---|
| 5,214,718 | A | | 5/1993 | Khosla |
| 5,293,429 | A | * | 3/1994 | Pizano et al. .................. 382/202 |
| 5,416,898 | A | | 5/1995 | Opstad |
| 5,455,875 | A | | 10/1995 | Chevion |
| 5,513,278 | A | * | 4/1996 | Hashizume et al. .......... 382/187 |
| 5,544,257 | A | * | 8/1996 | Bellegarda et al. ........... 382/187 |
| 5,636,291 | A | * | 6/1997 | Bellegarda et al. ........... 382/187 |
| 5,644,652 | A | * | 7/1997 | Bellegarda et al. ........... 382/186 |
| 5,710,832 | A | * | 1/1998 | Berman et al. ................ 382/189 |
| 5,805,747 | A | | 9/1998 | Bradford |
| 5,854,957 | A | | 12/1998 | Morikawa |
| 5,933,531 | A | | 8/1999 | Lorie |
| 6,426,806 | B2 | | 7/2002 | Melen |
| 7,130,480 | B2 | * | 10/2006 | Betrisey et al. ............... 382/260 |
| 7,313,277 | B2 | * | 12/2007 | Morwing et al. ............. 382/186 |
| 8,150,159 | B2 | * | 4/2012 | He et al. ....................... 382/182 |

OTHER PUBLICATIONS

Garris, Michael D., Intelligent System for Reading Handwriting on Forms, Thirty-First Annual Hawaii International Conference on System Sciences, Jan. 1998, vol. 3, 10 pages.
Paxton, Dr. K. Bradley, Issues in Handprint OCR Data Quality Assessment, Associate for Information and Image Management International Conference, Apr. 12, 1999, 14 pages.

(Continued)

*Primary Examiner* — Michelle Entezari
(74) *Attorney, Agent, or Firm* — Brian B. Shaw, Esq.; Jodi A. Reynolds, Esq.; Harter Secrest & Emery LLP

(57) ABSTRACT

A system and method for creating one of a plurality of test decks to qualify and test forms processing systems, including preparing a handprint snippet data base containing labeled handprint image snippets representing a unique hand, preparing a form description file and a data content file, selecting handprint snippets from the handprint snippet data base to formulate a form using the data content file, creating a form image using the selected snippets according to the form description file and printing the form image.

11 Claims, 8 Drawing Sheets

Method for Digital Test Deck™ Creation

OTHER PUBLICATIONS

Nagy, George, et al., Optical Character Recognition: An illustrated guide to the frontier, Dec. 1999, SPIE vol. 3967, 12 pages.

Paxton, Dr. K. Bradley, Digital Test Desks and What They Can Do for Your Forms Processing System, Feb. 11, 2003, 16 pages.

* cited by examiner

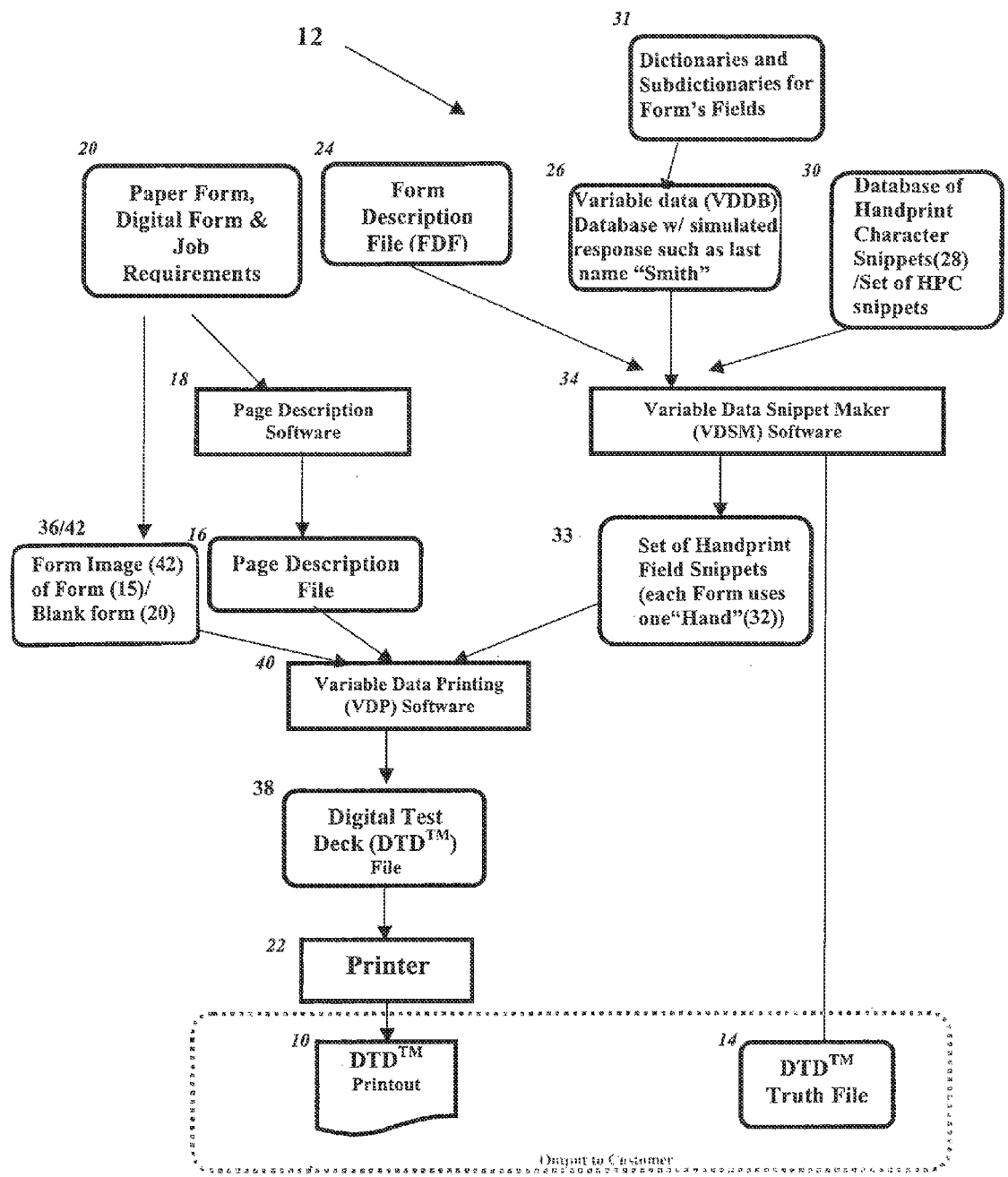
Fig. 1 Method for Digital Test Deck™ Creation

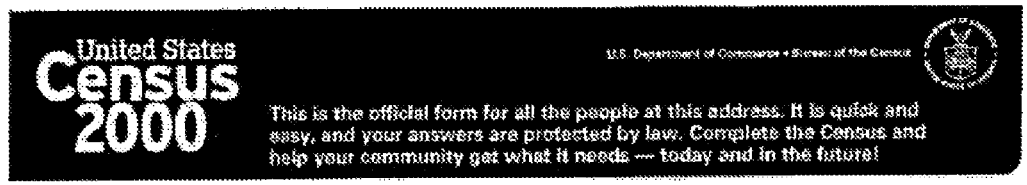
Fig. 2  Example of a blank form

Fig. 3  Example of a form filled out using a handprint font

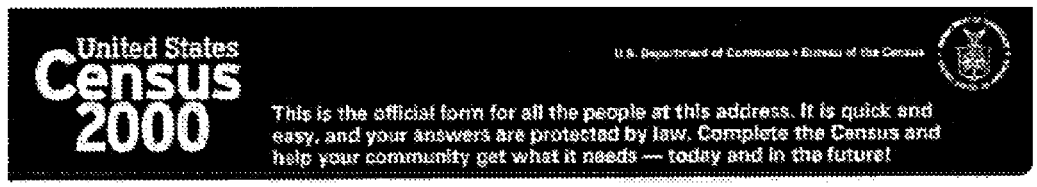
Fig. 4  Example of a form populated with actual handprint snippets

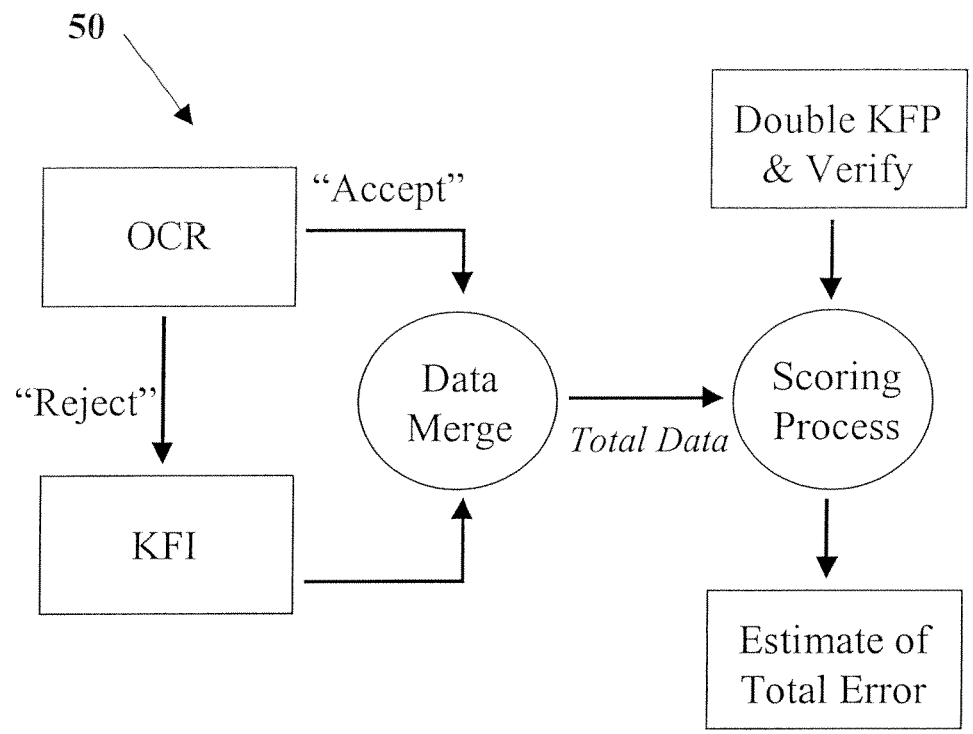
Fig. 5  A block diagram of a forms processing system

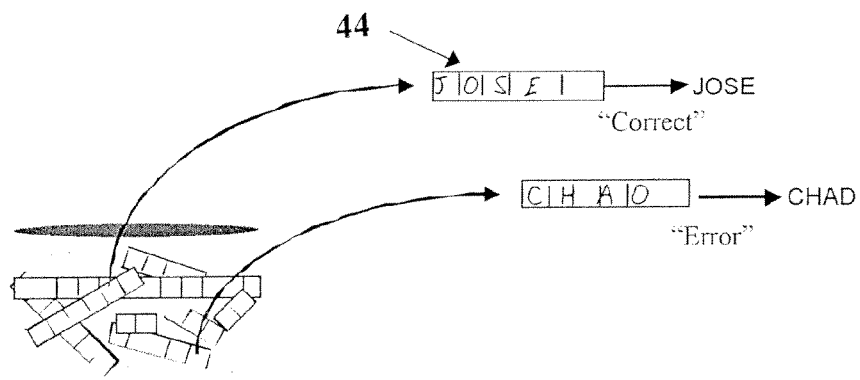
Fig. 6  The forms processing testing concept at the field level

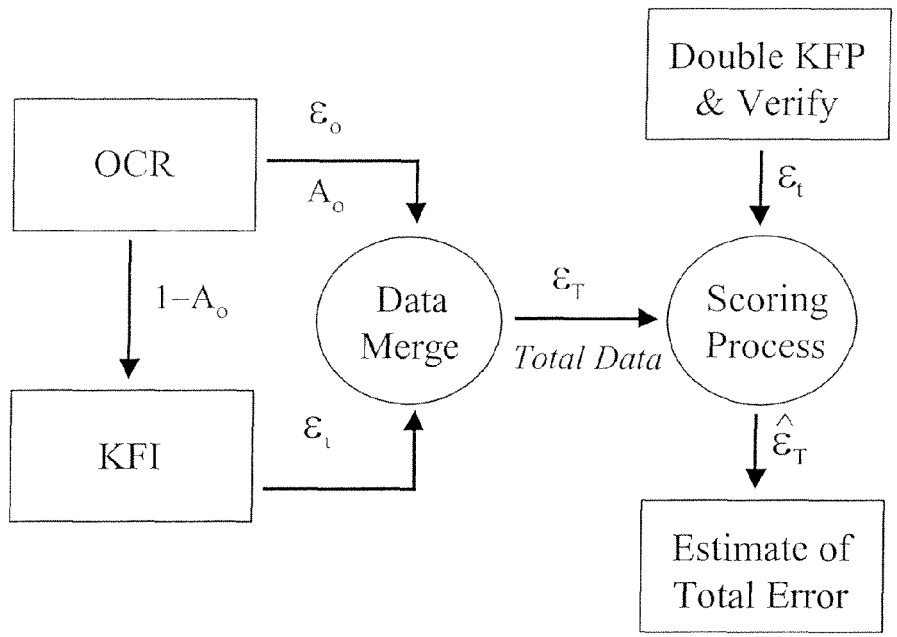
Fig. 7  A diagram of the mathematical system for measuring error

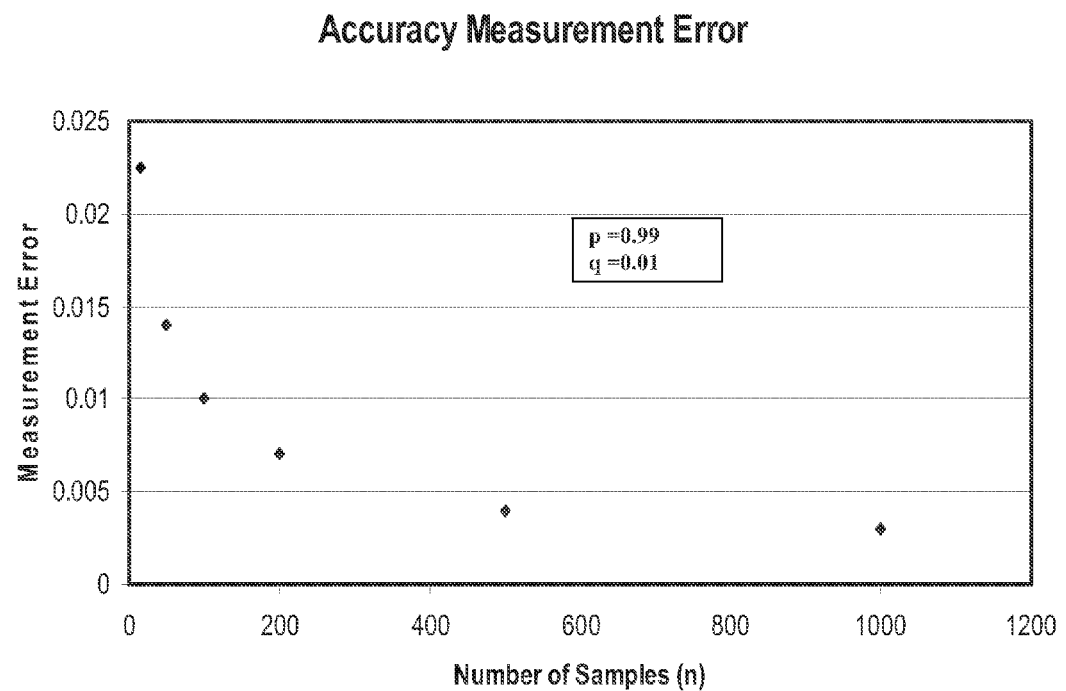
Fig. 8 A plot of an example of measurement error as a function of the number of samples

HANDPRINT RECOGNITION TEST DECK

CROSS-REFERENCE TO RELATED APPLICATIONS

This application is a continuation of prior U.S. patent application Ser. No. 10/933,002, filed Sep. 2, 2004, the entire disclosure of which is expressly incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates generally to forms processing technology and more particularly to a system and method to create test materials that can evaluate and help improve systems that recognize handprinted fields.

2. Description of Related Art

Forms processing technology can encompass many types of systems and include many steps including capturing handprinted data from questionnaires and putting the data into a computer. Many organizations doing forms processing use traditional "heads-down" keying from paper (KFP); and "heads-up" keying from image (KFI).

Traditional "heads-down" keying from paper (KFP) is an approach that involves human keyers sitting in front of a computer terminal, and looking down at a form placed on a rack. They read the data placed on the form by the respondent, and manually key this data into the computer using a KFP software package. People are not very consistent when performing routine tasks for long periods of time, and this process is prone to human error. A major source of error with KFP is placing the data in the wrong field.

"Heads-up" keying from image (KFI) is an approach that uses an electronic scanner to scan the forms before sending the electronic image of the form to a computer screen, along with fields where the human keyer is to key in data. The name comes from the fact that the keyer is looking straight ahead at the screen at all times. This method tends to be more accurate since it greatly reduces the incorrect field problem mentioned above for KFP. It is also often faster than KFP. Unfortunately, it still involves humans which are a constant source of errors.

A major problem with capturing handprinted data from forms filled out by human respondents is measuring the accuracy and efficiency of the total system. Former testing methods, such as using a handprint font, may be satisfactory for production readiness tests, but clearly are not adequate to claim to measure handprint recognition accuracy and efficiency. This is partly because they are considered "too neat" and would thus give an artificially high estimate of accuracy relative to the "real world."

Creating a test deck manually gives realistic variability but is a time-consuming and demanding task, and you only have one unique deck. Creating a corresponding TRUTH file to evaluate the accuracy of the system's processing adds significantly to the complexity of this task. A truth file is an accurate representation of the handprinted data on the forms. To be able to produce a deck of handprinted forms and the corresponding TRUTH file in a more timely and efficient manner would provide a valuable quality assurance tool.

Typical data collection forms request hand-printed response (rather than cursive) when clarity is required. However, there is great variability in the handprints prepared by the population in general. In order to perform adequate system testing and shakedown, a sufficient number of examples are required so that realistic variability can be characterized for use during testing and system evaluation.

Automation and cost savings can be realized by incorporating handprint Optical Character Recognition (OCR), so that computer systems attempt to recognize the handprinted fields, and send low confidence fields to KFI. The method of this patent creates test materials that make it possible to assess the accuracy of an entire form processing system more easily and consistently, as well as measure efficiency, regardless of whether KFP, KFI, OCR, or all of these are used in any combination. This invention simplifies the expensive and laborious process associated with the (hand made) test forms wherein the forms are keyed twice from paper, and discrepancies verified and corrected by a third person.

BRIEF SUMMARY OF THE INVENTION

Our invention is a method to measure handprint recognition accuracy and efficiency by creating a test deck to qualify and test handprint recognition systems. This includes preparing a handprint snippet data base containing labeled handprint image snippets that collectively or in part, may approximate actual respondent's handprinted characters. The method includes creating a page layout file, preparing a form description file as well as a data content file and then selecting handprint snippets from the handprint snippet database to populate a form creating a "completed" form image using the selected snippets according to the form description file. When printed, these forms may constitute a Digital Test Deck™.

BRIEF DESCRIPTION OF THE SEVERAL VIEWS OF THE DRAWING(S)

FIG. 1 schematically illustrates the test deck creation method.

FIG. 2 is an example of a blank form.

FIG. 3 is an example of a filled out form.

FIG. 4 is a form populated with actual handprint snippets.

FIG. 5 shows a form processing system.

FIG. 6 shows a testing concept at the field level.

FIG. 7 shows a diagram of the mathematical system for measuring error.

FIG. 8 shows an example plot of error results for this system as a function of the number of samples for this system.

DETAILED DESCRIPTION OF THE INVENTION

A digitally created printout 10 of this invention is created using a test deck system 12 as shown in FIG. 1. The print out 10 is sometimes referred to as the Digital Test Deck™ (DTD™), or simply the test deck 10, and can be used in a handprint recognition system to test the system for accuracy and to improve the efficiency of the forms processing technology. When accompanied by a TRUTH file 14, which accurately represents the data printed on the form and defines the expected output of the forms processing system, the test deck system 12 produces a very realistic and accurate set of testing forms. The DTD™ printout 10 can be used for production readiness and for baseline testing of forms processing systems such as shipping labels, bank checks and surveys for accuracy and efficiency.

The test deck system 12 for creating the DTD™ printout 10 includes a file such as an Adobe PDF or PostScript file that includes instructions to describe an appropriate form 15. It also includes a page description file (PD file) 16 formed by page description software 18. The PD file 16 may be an Adobe Quark Express file. The PD file 16 contains the instructions necessary to determine what form to use and how that form is to be filled out. The form may be a "blank" form 20 (See FIG. 2) that can be directed by the PD file 16 to be sent to a printer 22 which could be a traditional offset printer, a color digital printer, or other types of printers and then prints the page images of the forms in duplex or simplex, depending on the requirement.

This test deck system 12 also includes a form description file (FDF) 24 that describes the characteristics of the form's data fields. The FDF 24 contains information such as field length and whether the field is a check box, or a write-in field for marks or characters respectively. Field length can be measured in the number of marks or characters. The test deck system also includes a variable data database (VDDB) 26 that describes the desired content of the simulated respondent entries. The VDDB 26 is an ASCII database that tells what goes where on the printout. In the case where the field is a check box field, the VDDB 26 describes which check boxes are checked and which are blank and the type of mark that is expected. When the field is a write in field, the VDDB 26 contains a simulated response, such as a last name, "SMITH." The VDDB 26 allows customization depending on the form 20 used and the job requirements.

The test deck system 12 shown in FIG. 1 uses Handprint Character Snippets (HPC) 28 organized in an HPC snippet database 30. The HPC snippet database 30 can include characters, letters, symbols, or parts thereof, where a single character is defined by the set of legal symbols for the particular user or job requirement. The HPC snippet database 30 has an appropriate identification/numbering scheme for subsequent incorporation into the test deck system 12. The individual HPC snippet 28 is preferably an image clip containing a hand printed symbol (character, mark or punctuation mark) obtained from a real person. By using the digitally created printout 10 with HPC snippets 28, as described below, it is possible to test the accuracy of form processing by an Optical Character Recognition (OCR) method and/or system with the assurance the results are realistic.

Optical character recognition is often referred to as OCR or ICR (Intelligent Character Recognition). Optical character recognition refers to the process of automatically recognizing write-in fields from the scanned image of the form. Originally, OCR referred to the recognition of machine print, and is used by government institutions, but has also been used as a generic name for recognition of handprint as well. Sometimes, the type of OCR used for handprint is called "Handprint OCR." Optical Mark Recognition (OMR) is a related process and refers to the process of automatically recognizing the answers to check-box questions from the scanned image of the form. It is a more advanced version of its predecessor which was known as "mark sense" which determined if a particular circle or other shape was completely filled in by the respondent.

The VDDB 26 contains acceptable responses for each data field on the form effectively simulating the data that would be obtained from a real respondent that had completed the form but with advantages that are important to improved accuracy and efficiency mentioned above. The VDDB 26 can be created from a dictionary of acceptable data for each field. The VDDB 26 is capable of specifying the placement of letters such as upper case or lower case to more closely simulate actual respondent data and/or changing the placement of the handprint character snippet in reference to a boundary by one or more of the handprint character snippet's position, angle, or size. These letters can extend below the line as if written by hand. These letters include those that have extensions such as g, j, p, q, and y, and can be composed from one or more HPC snippets 28 as will be discussed in detail below.

The test deck system 12 shown in FIG. 1 incorporates a HPC snippet database 30 of characters, symbols and/or digital images. The HPC snippet database 30 classifies the characters and/or digital images by similarity and/or a feature set. The HPC snippet database 30 contains all the valid or verified character images which have been collected to date in the project. These can come from one or more different sources and mixed together using a computer. The one or more of the sources can include computer-generated samples. The HPC snippet database 30 works in conjunction with Field Dictionaries 31 and/or alternatively, with subfield Dictionaries, which can be ASCII files. This dictionary 31 contains a table of valid entries for any given field on the blank form 20. When there is a complex linkage between fields in a form, such as between the preparer's gender and first name, the dictionary can be subdivided into subfield directories. This method creates the test deck used to qualify and test handprint recognition systems by preparing a handprint snippet database containing labeled handprint image snippets; preparing a form description file and page description file to describe a form; preparing a variable data database that describes the desired content of the simulated respondent entries using the handprint character snippets; populating the form using the variable data database in conjunction with the form description file, the page description file, and the handprint snippet database; and printing the completed form.

The test deck system uses a "Hand" 32 defined as an "adequate" supply of characters or symbols, preferably from the HPC snippets database 30, to create the set of handprint field snippets 33 which satisfy the field data requirements for the VDDB file 26. The process is controlled by the variable data snippet maker (VDSM) software 34. The hand 32 can be a Homogeneous Hand which is a Hand in which all the characters are similar dimensional characteristics and features (i.e., slant, line width, height, etc.), so that the set of handprint field snippets 33 created from this homogeneous hand 32 look as though they were filled in by one individual. VDSM software 34 describes the logic that controls handprint field snippet generation including the production of the set of handprint field snippets 33 that are to be put on the form image 36 of the appropriate form 15. The VDSM software 34 uses the data field information found in the VDDB file 26 and the field description found in the FDF 24 to appropriately select HPC snippets 28 and electronically paste the set of handprint field snippets 33 together. The handprint field snippets 33 are subsequently electronically pasted onto the digital test deck file 38, using variable data printing software 40 to vary or raster images as is known by those in the art. It is sometimes advantageous to incorporate a random or alternatively a defined noise into the data to simulate certain environmental or expected effects.

At the same time the set of handprint filed snippets 33 are used to create the digital test deck 38, the well-defined TRUTH file 14 is being constructed to contain the "answer" expected from the system using the form supplied. The HPC snippets 28 are digitally pasted together to construct the set of handprint field snippets 33 described above. This set of handprint field snippets 33 will be subsequently printed on the printout 10. The HPC snippet database 30 can be used in conjunction with the VDSM software 34, and data field information as well as the field descriptions, to create snippets that are placed on the fringe of acceptable units; such as a snippet touching a boundary or another character, with at least one point. The HP snippets 28 can also be cast into a vector representation if necessary, or placed in reference to a boundary by one or more of the HP snippets.

A form image 42, the page description file 16, and the handprinted field snippets 28 are processed through variable data printing software (VDP) 40 to create the Digital Test Deck™ (DTD™) file 38. The DTD™ file 38 is sent to a printer 22, which may be offset or digital, to produce the DTD™ printout 10. This printout and the DTD™ TRUTH file 14 comprise the system output that is available to the customer for test purposes.

Digital Test Deck™

The DTD™ 10 containing simulated human handprint, looks like a form prepared by a real person even through they are printed by a digital printer and contain perfectly known data. Using these decks, a forms processing system may be tested for accuracy and efficiency, regardless of the technology used for the data capture. More specifically, the state of the processing system may be reliably assessed at any point in time. A well-defined TRUTH FILE 14 is also developed by the handprint recognition system using extracted data from the forms to accurately represent the data placed within the DTD™. The truth file 14 would contain the "answer" that is expected from a handprint recognition system, and can be used to determine the accuracy of said system.

Figure 3:
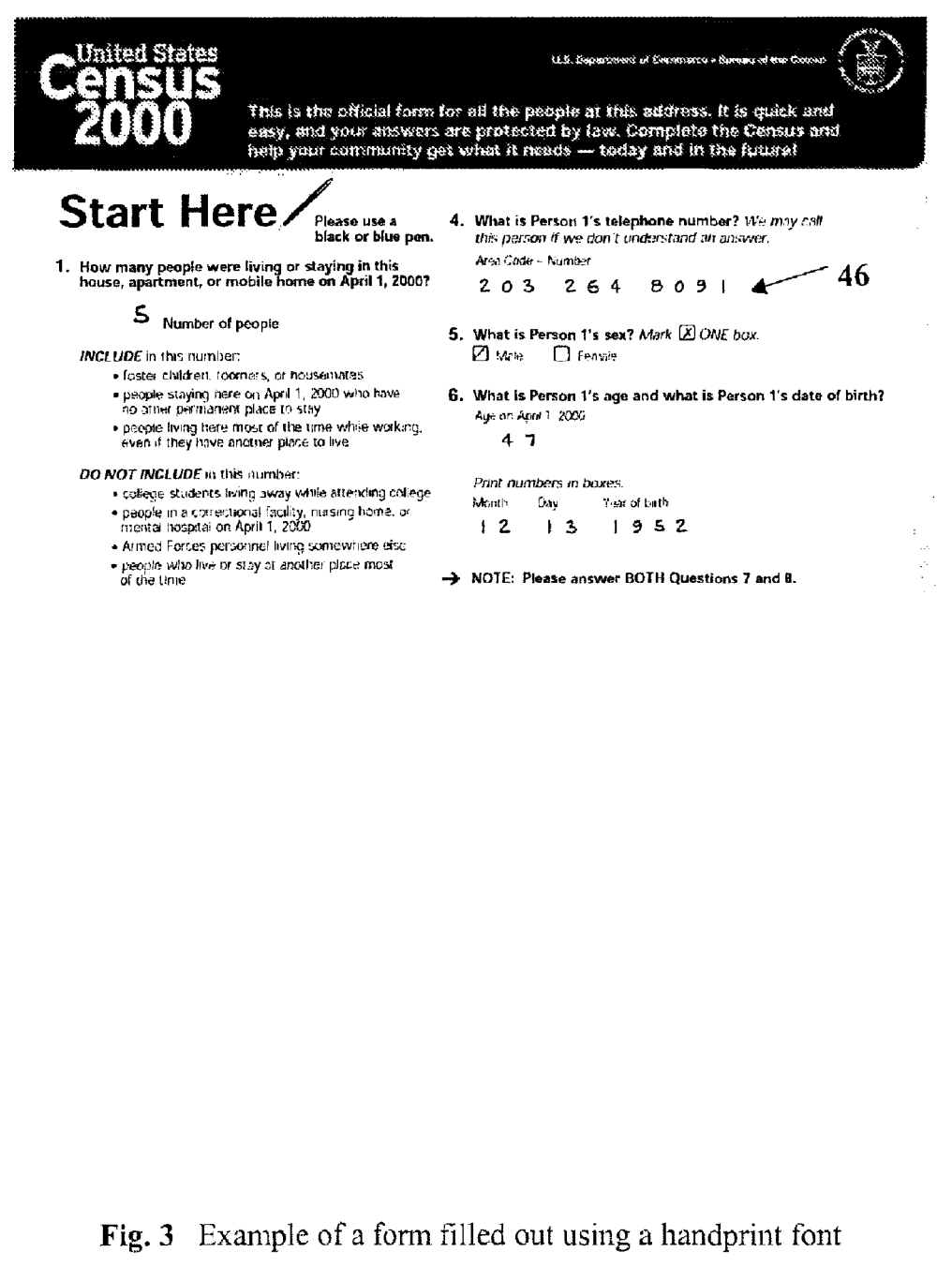

FIG. 2 shows a blank form, which is a portion of the Year 2000 Decennial Census "short" form. This is an example of a form that would benefit from the described system and method. There are places on this (blank) form 20, called fields 44, where the respondent is asked to print the answers to questions posed by the Census Bureau. When the respondent completes these fields, the form might look like FIG. 3 displaying fictitious data 46 in fields 44. Most people would say this was an actual Census form image, albeit a rather neat one, but it was actually created using a handprint font on a computer. This is one example of a digital test form. A suitable number of different digital test forms would constitute the test deck.

The basic properties of the test deck as defined above are:
- looks and feels like a real form with handprinted responses, but really printed on a high quality digital color (or black & white) printer;
- form content designed to test critical system aspects;
- reproducible as required;
- compliments, but does not replace forms with "real data" content;
- consistent test input;
- test the data capture system "end-to-end;" and
- know the "truth" perfectly.

The fourth bullet indicates that using handprint fonts results in a rather excessively "neat" simulated form, being created, and so the form is of limited use in actually measuring OCR data capture quality per se. However, using actual handprint "snippets" 28 in the creation of the test deck 10 gives a very realistic appearance, as shown in FIG. 4 (again using fictitious data).

The test deck 10 is used to:
- verify correct operation of critical system components;
- establish a measurable system performance baseline;
- test system operation at each software/hardware change;
- test daily production operational readiness before scanning;
- test consistency of system between scan operations, sites and over time;
- verify system "improvements."

This invention enables "outside-in" testing. If a perfectly known input is inserted into the system, and (mostly) the correct answers come out, then it is unlikely that there is anything seriously wrong in between. Alternatively, "inside-out" testing, analyses all possible internal variables such as a measure of the lamp intensity on the left-hand side of the scanner, or the speed of the scanner transport, etc. The problem with an "inside-out" approach is that it may literally fill up file cabinets with data in this manner, and it will be the element or factor that is not tested that causes the system to fail or create erroneous data. The "outside-in" approach used in this invention is advantageous because testing is simple, cost-effective, accurate, and consistent.

How to Measure Accept Rate and Accuracy of a Forms Processing System

FIG. 5 shows a typical forms processing system 50 which uses automatic recognition (OCR) to do the bulk of the data capture workload, and KFI for data capture of those rejected fields for which the OCR system is not confident. The terms Accept Rate and Accuracy Rate are used as a measure of the accuracy of the system under test. In automated recognition of hand printed fields, the Accept Rate is the fraction of the fields in which the OCR has high confidence, usually expressed as a percent. These "accepted" fields are the ones noted for OCR accuracy. Accepted fields are not sent to keyers except for quality assurance purposes, while in noting the OCR "accepted" fields, that fraction of the (non-blank) fields that are "correct" is the Accuracy Rate, usually expressed as a percent. Also shown are the steps taken to measure the accept rate and accuracy of the system. Finally the Error Rate for either OCR or OMR is defined as 100% minus the Accuracy Rate in percent. So for example, if the Accuracy Rate is 99.2%, the Error Rate is 0.8%.

Related to the error rate is the Reject Rate. The Reject Rate for recognition is 100% minus the Accept Rate in percent. So, if the Accept Rate is 80%, the Reject Rate is 20%. Rejected fields are the low confidence fields from the OCR, and are sent to keyers to be keyed because the automatic OCR isn't sure it has the correct answer. For OMR, the Accuracy Rate is that fraction of all the check-box fields that are correct, usually including blanks. Blanks are commonly included in scoring OMR because there is no way for the computer to know if a check-box contains a mark or not without looking at it, and so an empty check-box which is properly identified as such is considered a "correct" output of OMR. Scoring (also called: an accuracy rate) includes the calculation of the accuracy of an OCR or keying (data collection) system. A TRUTH File 14 also referred to as the ground truth or answer file, contains the set of values expected as output from an OCR/OMR system upon extracting the respondent completed information from a form. When the present invention is used this TRUTH File 14 can be generated as described below.

A portion of the test deck system 12 is shown schematically in FIG. 6 where all of the fields 44 in all the forms are being tested together. The fields 44 are pulled out one at a time for testing. If the handprint was J-O-S-E and the resultant ASCII was JOSE, that would be a correct field, termed a "hard match", meaning each and every character is correct in a field. On the other hand, if the handprint was C-H-AO and if the resultant ASCII was CHAD, there would be an error using the hard match criterion.

Here, the total error estimate is:

$$\epsilon_\tau = \epsilon_o A_o + \epsilon_i(1-A_o) + \epsilon_\tau$$

$\epsilon_o$ = OCR Error $A_o$ = OCR Accept Rate $\epsilon_i$ = KFI Error $\epsilon_\tau$ = "Truth" Error $\epsilon_\tau$ = Total Data Error and the Estimator is shown with a ^ over the $\epsilon_\tau$.

FIG. 7 shows a mathematical representation of the results of applying this test deck system 12.

How to Associate Measurement Error with Number of Samples

If an accuracy in the neighborhood of p=99%, corresponding to an error rate of q=1% is needed, then the following relationship approximately describes the one-sigma sampling error in the estimate:

$$\sigma = \sqrt{\frac{pq}{n}}$$

where n is the number of samples. FIG. 8 is a plot of the measurement error as a function of the number of samples.

Using this method, it is possible to determine how many samples are needed to obtain the desired level of quality in estimating the desired system accuracy. FIG. 8 shows that many samples may be needed to test the test deck system 12 properly. This invention makes creating a large number of samples cost-effective compared to previous manual methods.

Test Materials for Forms Processing Systems

Six basic types of test materials are used to test forms processing systems are:
1. Blank forms;
2. Forms hand-marked by volunteers;
3. Real forms filled out by respondents;
4. Images of real forms on CD-ROM;
5. Lithographically printed forms with simulated respondent marks;
6. Digitally printed forms with simulated respondent marks.

Each of these types of test materials has a purpose, and has advantages and disadvantages. By a suitable combination of these materials, tests may be devised to cover all testing needs.

While the invention has been described in connection with various embodiments, it is not intended to limit the scope of the invention to the particular form set forth, on the contrary, it is intended to cover such alternative, modification, and equivalents as may be included within the spirit and scope of the invention as defined by the appended claims. In particular, the test decks described herein could be comprised of a wide variety of printed forms in addition to questionnaires; for example, bank checks, shipping labels, and other types of printed forms.

The invention claimed is:

1. A method for creating one of a plurality of test decks to qualify and test handprint recognition systems, the method comprising:
    (a) preparing a handprint snippet database containing a plurality of sets of handprint image snippets, each set of handprint image snippets having each upper and lower case letter and number taken from actual hand printed upper and lower case letters and numbers, wherein all of the hand printed upper and lower case letters and numbers in each set are created by a single individual, wherein the actual upper or lower case letter or number intended to be written by the individual creator of each handprint image snippet is known and is associated with the handprint image snippet in the database, and, wherein each set of handprint image snippets contains a plurality of instances of all the upper and lower case letters and numbers in the set, the plurality of instances of each upper and lower case letter and number having non-identical characteristics;
    (b) preparing a page description file for each of the plurality of test desks that includes instructions for determining which form to use and how to fill out the form and a form description file for each page of each form that describes characteristics of data fields of a form in the test deck;
    (c) preparing a variable data database that describes the desired content of the simulated respondent entries using the handprint image snippets;
    (d) selecting handprint image snippets to populate the form using the variable data database in conjunction with the form description file, the page description file; and
    (e) printing the completed form.

2. The method of claim 1, further comprising incorporated noise into the handprint image snippet database.

3. The method of claim 1, further comprising changing the placement of the handprint image snippet in reference to a boundary by one or more of the position, angle, or size of the handprint image snippet.

4. The method of claim 1, further comprising creating handprint image snippets positioned on fringe of acceptable limits so that the handprint image snippet touches the boundary or another handprint image snippet in at least one point.

5. The method of claim 1, wherein the handprint image snippets are cast into a vector representation.

6. The method of claim 1, further comprising software to help define the placement of handprint image snippets on the form.

7. A system of creating one of a plurality of test decks from handprint image snippets to qualify and test handprint recognition systems (OCR) comprising:
    (a) a database of handprint snippets containing a plurality of sets of handprint image snippets, each set of handprint image snippets having each upper and lower case letter and number taken from actual hand printed upper and lower case letters and numbers, wherein all of the hand printed upper and lower case letters and numbers in each set are created by a single individual, wherein the actual upper and lower case letter or number intended to be written by the individual creator of each handprint image snippet is known and is associated with the handprint image snippet in the database, and, wherein each set of handprint image snippets contains a plurality of instances of all the upper and lower case letters and numbers in the set, the plurality of instances having non-identical characteristics;
    (b) data relating to one of a plurality of test decks, including a form description file that describes the characteristics of data fields of a form, a page description that includes instructions for determining which form to use and how to fill out the form, and a variable data database that describes the desired content of the simulated respondent entries using the handprint character snippets;

(c) variable data printing software receiving the data from a) and b); and (d) printing software for printing at least two non-identical instances of the upper and lower case letters or numbers from one of the plurality of sets of handprint image snippets using the variable data database to create one of a plurality of digital test decks.

8. The system of claim 7, further comprising computing software for controlling the image raster processor while rastering the handprint image snippets.

9. The system of claim 7, further comprising rastering the handprint image snippets to incorporate changes in angle, size, or position.

10. The system of claim 7, further comprising handprint image snippets, including various handprint image snippets positioned in relation to four boundaries of a rectangle.

11. The system of claim 7, further comprising printing one of a plurality of digital test decks comprising a plurality of forms for use in qualifying and testing an OCR system.

* * * * *